United States Patent
Ragan et al.

(10) Patent No.: US 11,745,949 B2
(45) Date of Patent: Sep. 5, 2023

(54) MODULAR CONVEYOR BELT WITH HOOK HINGES

(71) Applicant: Laitram, L.L.C., Harahan, LA (US)

(72) Inventors: Bryant G. Ragan, Metairie, LA (US); John de St. Germain, Ponchatoula, LA (US); Adam E. Bannerman, Mandeville, LA (US)

(73) Assignee: Laitram, L.L.C., Harahan, LA (US)

( * ) Notice: Subject to any disclaimer, the term of this patent is extended or adjusted under 35 U.S.C. 154(b) by 135 days.

(21) Appl. No.: 17/426,205

(22) PCT Filed: Feb. 4, 2020

(86) PCT No.: PCT/US2020/016504
§ 371 (c)(1),
(2) Date: Jul. 28, 2021

(87) PCT Pub. No.: WO2020/163270
PCT Pub. Date: Aug. 13, 2020

(65) Prior Publication Data
US 2022/0106125 A1    Apr. 7, 2022

Related U.S. Application Data

(60) Provisional application No. 62/801,693, filed on Feb. 6, 2019.

(51) Int. Cl.
| | |
|---|---|
| *B65G 15/48* | (2006.01) |
| *B65G 17/08* | (2006.01) |
| *B65G 23/06* | (2006.01) |
| *B65G 47/96* | (2006.01) |
| *F16G 3/10* | (2006.01) |

(52) U.S. Cl.
CPC ............... *B65G 15/48* (2013.01); *F16G 3/10* (2013.01); *B65G 17/083* (2013.01)

(58) Field of Classification Search
None
See application file for complete search history.

(56) References Cited

U.S. PATENT DOCUMENTS

| | | |
|---|---|---|
| 853,129 A | 5/1907 | Simpson |
| 3,451,526 A | 6/1969 | Fernandez |
| 3,680,927 A | 8/1972 | Neureuther |
| 3,722,743 A | 3/1973 | Atchley |

(Continued)

FOREIGN PATENT DOCUMENTS

| | | |
|---|---|---|
| DE | 1099920 B1 | 2/1961 |
| DE | 2020106 A1 | 11/1971 |

(Continued)

OTHER PUBLICATIONS

Extended European Search Report of the European Patent Application No. 20752761.5, dated Oct. 27, 2022, European Patent Office, Munich, Germany.

*Primary Examiner* — Kavel Singh
(74) *Attorney, Agent, or Firm* — James T. Cronvich (57) ABSTRACT

Conveyor belt modules having rodless hook hinges and modular conveyor belts constructed of those modules. Hooks on opposite ends of belt modules hook into complementary hooks on adjacent modules to interconnect the modules at hinge joints into an endless belt. The geometry of the modules enables them to be manufactured by extrusion.

24 Claims, 9 Drawing Sheets

(56) References Cited

U.S. PATENT DOCUMENTS

| | | | |
|---|---|---|---|
| 4,016,971 A * | 4/1977 | Komossa | A24B 7/14 100/151 |
| 4,170,281 A | 10/1979 | Lapeyre | |
| 4,213,527 A * | 7/1980 | Lapeyre | B26D 1/00 264/156 |
| 4,473,365 A | 9/1984 | Lapeyre | |
| 4,537,658 A | 8/1985 | Albert | |
| 4,776,454 A | 10/1988 | Momose | |
| 4,971,191 A * | 11/1990 | Lapeyre | B65G 17/08 198/853 |
| 4,981,210 A | 1/1991 | Komylak | |
| 5,174,438 A | 12/1992 | Witham et al. | |
| 5,316,133 A | 5/1994 | Moser | |
| 6,569,290 B2 | 5/2003 | Johnson | |
| 7,278,535 B2 | 10/2007 | Damkjaer | |
| 7,314,132 B2 | 1/2008 | Layne et al. | |
| 7,360,644 B1 | 4/2008 | Lucchi et al. | |
| 7,364,038 B2 | 4/2008 | Damkjaer | |
| 7,367,447 B1 | 5/2008 | Harrison | |
| 7,419,051 B2 | 9/2008 | Damkjaer | |
| 7,559,422 B2 | 7/2009 | Layne et al. | |
| 7,757,841 B2 | 7/2010 | Fandella | |
| 8,469,177 B2 | 6/2013 | Steenwyk et al. | |
| 8,579,104 B2 | 11/2013 | Weiser et al. | |
| 8,985,304 B2 | 3/2015 | Guernsey et al. | |
| 9,056,729 B2 | 6/2015 | Hu et al. | |
| 9,908,708 B1 | 3/2018 | Adomaitis et al. | |
| 10,173,844 B2 | 1/2019 | Adomaitis et al. | |
| 10,183,808 B2 | 1/2019 | Menke | |
| 10,464,757 B2 | 11/2019 | Bauer | |
| 2016/0185529 A1 | 6/2016 | Bauer | |

FOREIGN PATENT DOCUMENTS

| | | |
|---|---|---|
| DE | 2020108 A1 | 11/1971 |
| DE | 2160429 A1 | 6/1972 |
| DE | 19744440 A1 | 4/1999 |
| DE | 102004019950 A1 | 11/2005 |
| EP | 1520656 A1 | 4/2005 |
| FR | 1192520 A | 10/1959 |
| GB | 383635 A | 11/1932 |
| GB | 1494138 A | 12/1977 |
| GB | 2177992 A | 2/1987 |
| KR | 10-1996-0010529 B1 | 8/1996 |
| WO | 2005028248 A1 | 3/2005 |
| WO | 2011098385 A1 | 8/2011 |
| WO | 2013191957 A1 | 12/2013 |

* cited by examiner

MODULAR CONVEYOR BELT WITH HOOK HINGES

BACKGROUND

The invention relates generally to power-driven conveyors and more particularly to modular conveyor belts or chains that articulate at hinges joining belt modules.

Modular conveyor belts or chains are commonly constructed of rows of one or more belt modules connected end to end at hinge joints. The hinge joints are formed by interleaved hinge eyes along leading and trailing ends of adjacent belt rows. Hinge rods installed in the aligned interleaved hinge eyes at each hinge joint interconnect adjacent rows. Aligning hinge eyes and inserting hinge rods, especially in wide belts, can require substantial assembly time. Belt tension concentrated at the hinge eyes can cause the hinge rods to deform into a cam-shaft shape resulting in weakened hinge rods and a stretched belt that does not properly engage drive and idle sprockets. Removing a modular conveyor belt from a conveyor frame requires that one of the hinge rods be pulled out of a hinge joint. In wide belts, in belts whose hinge rods have deformed, and in belts with various kinds of rod retention structure, pulling the hinge rod can be difficult. And because installing a modular conveyor belt on a conveyor frame requires that a hinge rod be pushed into a hinge joint to close the belt loop, that task can be difficult, too.

SUMMARY

One version of a conveyor belt module embodying features of the invention comprises a module body extending in a width direction from a first side to a second side and in a length direction from a first end to a second end. A first hook, disposed at the first end of the module body, has a tip end; and a second hook, disposed at the second end of the module body, has a tip end. The first hook forms a first curved channel having an open end and a closed end. The first curved channel defines a first path perpendicular to the width direction. The first curved channel receives the second hook at the second end of an adjacent conveyor belt module to connect the conveyor belt module to the adjacent conveyor belt module at a hinge joint at which the connected conveyor belt modules articulate as the second hook advances and retreats along the first path. The second hook and the first curved channel are complementary in shape so that a portion of the second hook received in the first curved channel fills the width of a portion of the first curved channel in which the second hook is received.

Another version of a conveyor belt module comprises a module body that extends in width from a first side to a second side and in length from a first end to a second end. A first hook is disposed at the first end of the module body, and a second hook is disposed at the second end of the module body. The first hook at the first end is adapted to hook the second hook at the second end of an adjacent conveyor belt module to connect the conveyor belt module to the adjacent conveyor belt module. The first and second hooks comprise hook segments separated by one or more gaps.

Still another version of a conveyor belt module comprises a module body that extends in width from a first side to a second side and in length from a first end to a second end. A first hook is disposed at the first end of the module body, and a second hook is disposed at the second end of the module body. The first hook at the first end is adapted to hook the second hook at the second end of an adjacent conveyor belt module to connect the conveyor belt module to the adjacent conveyor belt module. The first and second ends of the module body are angled at the same angle off vertical.

Yet another version of a conveyor belt module comprises a module body that extends in width from a first side to a second side and in length from a first end to a second end. A first hook is disposed at the first end of the module body, and a second hook is disposed at the second end of the module body. The first hook at the first end is adapted to hook the second hook at the second end of an adjacent conveyor belt module to connect the conveyor belt module to the adjacent conveyor belt module. The first end of the module body has a first undulating pattern and the second end of the module body has a second undulating pattern.

One version of a conveyor belt embodying features of the invention comprises a length of a modular conveyor belt that has a first end and a second end and hinge elements spaced apart along the first and second ends with aligned holes through the hinge elements. The modular conveyor belt articulates at hinge joints whose regular spacing defines a belt pitch. A first connection module has a first end and a second end and a hook at the first end and spaced apart hinge elements with aligned holes along the second end that interleave with the hinge elements along the first end of the length of modular conveyor belt. The aligned holes of the interleaved hinge elements form a first passageway across the width of the modular conveyor belt. A second connection module has a first end and a second end and a hook at the second end and spaced apart hinge elements with aligned holes along the first end that interleave with the hinge elements along the second end of the length of modular conveyor belt. The aligned holes of the interleaved hinge elements form a second passageway across the width of the modular conveyor belt. A first hinge rod received in the first passageway connects the first connection module to the second end of the length of the modular conveyor belt to form a first hinge joint. A second hinge rod received in the second passageway connects the first connection module to the first end of the length of the modular conveyor belt to form a second hinge joint.

Another version of a conveyor belt comprises a plurality of conveyor belt modules, each extending in width from a first side to a second side and in length in a direction of belt travel from a first end to a second end. Each module includes first hooks along the first end and second hooks along the second end. The first hooks of each conveyor belt module hook with the second hooks of an adjacent one of the modules at hinge joints to form an endless belt loop. A first recessed track extends along the first end between the first hooks, and a second recessed track extends along the second end between the second hooks. The first recessed track of each conveyor belt module forms with the second recessed track of an adjacent conveyor belt module an elongated slot extending across a portion of the width of the conveyor belt modules. A mover received in each elongated slot engages the first and second recessed tracks for movement along the elongated slot. The mover includes an upper portion that protrudes above the slot and a lower portion that protrudes below the slot.

BRIEF DESCRIPTION OF THE DRAWINGS

FIG. 5 is an enlarged side view of the hinge joint of two interconnected modules as in

FIG. 1.

DETAILED DESCRIPTION

Figure 1:
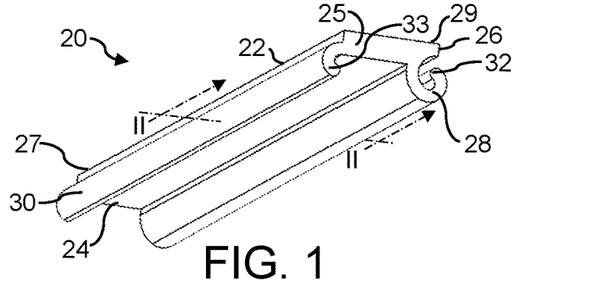
FIG. 1 is an isometric view of one version of a belt module embodying features of the invention.

A conveyor belt module embodying features of the invention is shown in FIG. 1. The module 20 has a module body 22 that extends in width from a first side 24 to a second side 25 and in length from a first end 26 to a second end 27. The module body 22 has a top surface 29 atop which conveyed articles ride. A first hook 28 extends across the full width of the module 20 at the first end 26 of the module body 22. A second hook 30 extends across the width of the module 20 at the second end 27 of the module body 22. The first hook 28 bends upward to a tip end 32, and the second hook 30 bends downward to a tip end 33. The arc length of the first hook 28 is greater than the arc length of the second hook 30.

Figure 2:
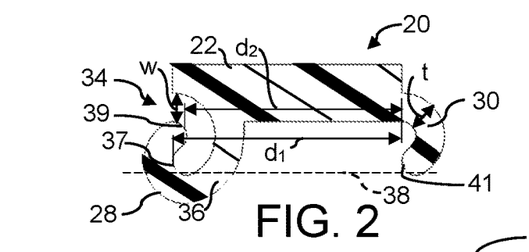
FIG. 2 is a cross sectional view of the belt module of FIG. 1 taken along lines II-II.

The cross sections of the conveyor belt module 20 in any plane parallel to the first and second sides 24, 25 are identical and represented by the cross section shown in FIG. 2. For this reason the module 20 can be made by extrusion and cut to the proper width. The modules 20 may be extruded out of polymer material or out of metal. For example, the modules 20 can be made of extruded aluminum for strength and then, in a secondary operation, one or the other of the hooks 28, 30 can be coated with bronze for lower friction or longer wear. Another possibility is co-extruding the module with a silicon-based top layer atop a metal module-body substrate. Of course, the modules 20 could alternatively be made of plastic by injection molding or of metal by casting.

Figure 3:
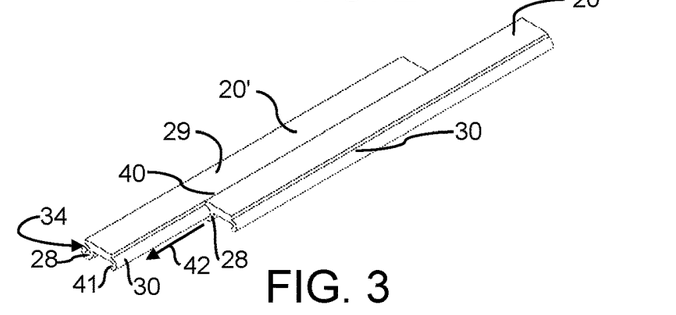
FIG. 3 is an isometric view of two belt modules as in FIG. 1 being interconnected.

As shown in FIG. 2, the first hook 28 bounds a first curved channel 34 that is complementary in shape to the second hook 30 and has a channel width w slightly greater than the thickness t of the second hook. And a lower portion 36 of the first hook 28 lies below the level 38 of the bottom of the second hook 30. The channel 34 defines a curved path for the second hook 30 that extends about 180° from an open end to a closed end 37. The curved path is perpendicular to the width direction of the module 20. The distance $d_1$ from the second end 27 of the module body 22 to the closed end 37 of the channel 34 is greater than the distance $d_2$ from the second end to a tip end 39 of the first hook 28. This increases the contact area of the two engaged hooks and better distributes the belt tension and, in some cases, increases the backward belt articulation. As shown in FIG. 3, the complementary shapes of the hooks 28, 30 at opposite ends of the module 20 allow the first hook 28 at the first end 26 of a module 20 to hook the second hook 30 of an adjacent module 20' at a hinge joint 40. And the dimensions of the second hook 30 and the first curved channel 34 are close enough that a portion of the second hook in the channel fills the width of a portion of the channel in which the second hook resides. And when a tip end 41 of the second hook (FIG. 2) is at the closed end 37 of the first curved channel 34 of the adjacent module, the second hook fills the channel. The second hook 30 advances and retreats along the curved path formed by the channel 34 of the adjacent module's first hook 28 as the belt articulates at the hinge joint 40. The modules 20, 20' are connected by aligning the channel 34 of the first hook 28 with the second hook 30 and sliding one of the modules 20 along the other module 20' in the direction of the arrow 42. No hinge rod is needed to hold the modules together. The flat top surfaces 29 of the connected modules 20 produce a belt with a completely continuous flat conveying surface.

Figure 4:
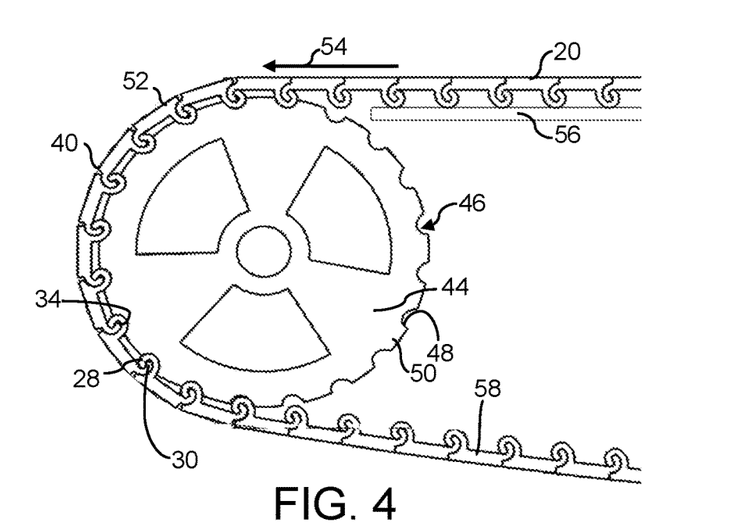
FIG. 4 is a side elevation view of a portion of a belt conveyor made up of modules as in FIG. 1.

A portion of a conveyor belt constructed of interconnected belt modules 20 is shown rounding a motor-driven drive sprocket 44 in FIG. 4. The sprocket 44 has drive pockets 46 that receive the bottom portion 36 of the first hooks 28. A drive face 48 on a tooth 50 trailing each pocket 46 engages the first hooks 28 and drives the belt 52 in the direction of the arrow 54 and around the sprocket 44 as the belt transitions from an upper carryway 56 to a lower return 58. When rounding the sprocket 44, the belt 52 articulates at the hinge joints 40. During forward articulation, the second hooks 30 retreat slightly away from the ends of the channels 34 in the interconnected first hooks 28. Because of the hooked hinge joints 40, the belt 52 is self-supporting in the return.

Figure 5:
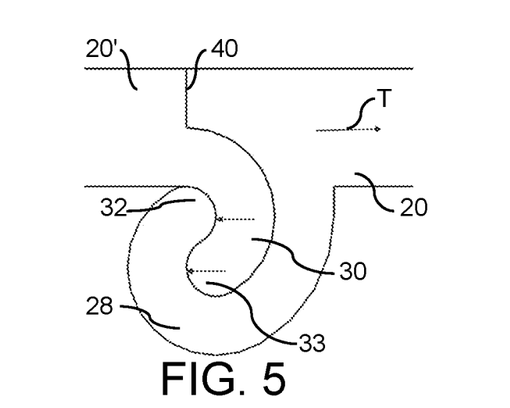
Figure 6:
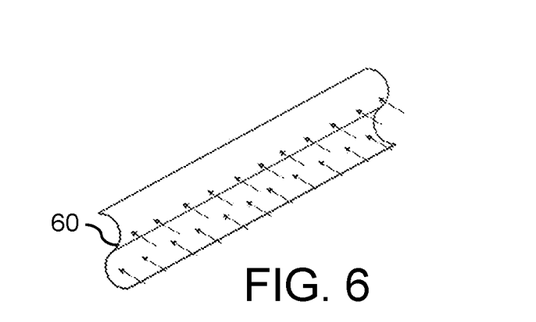
FIG. 6 is a representation of the tension force acting on the hinge joint of FIG. 5.

FIGS. 5 and 6 show how tension T at the hinge joint 40 between adjacent modules 20, 20' is distributed uniformly across the width of the modules. Belt tension T tends to separate the modules 20, 20'. The tension is borne by the interconnected hooks 28, 30 at their tip ends 32, 33 across the width of the modules 20, 20' as in FIG. 6 showing the contour 60 of the tip ends of the interconnected hooks and the distributed tension.

Figure 7:
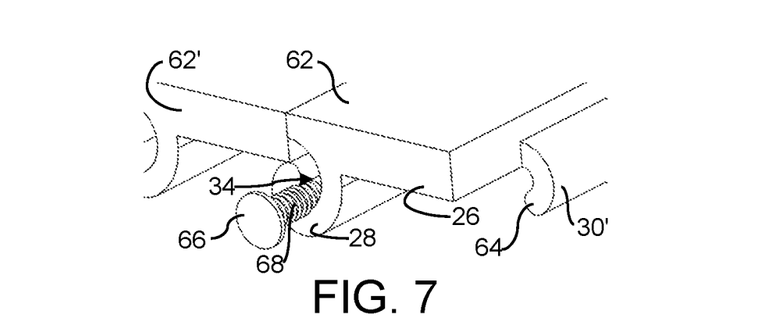
FIG. 7 is an enlarged isometric view of a stop plug in a slightly different belt module usable in a conveyor belt as in FIG. 4.

A slightly different version of a conveyor belt module is shown in FIG. 7. The module 62 differs from the module 20 of FIG. 1 in that the lateral end 64 of the second hook 30' is indented inward from the first side 26 of the module. The indentation can be made in an extruded module by a secondary machining operation. The indentation provides room for a stop plug 66 to be inserted into the channel 34 of the unindented first hook 28 to prevent the relative lateral movement of the interconnected modules 62, 62'. The second hook 30' is similarly indented inward from the opposite second side (not shown) of the module 62 so that a stop plug 66 can be installed. The plug 66 has barbs 68 for easy installation, but difficult removal to keep the interconnected modules 62, 62' in registration.

Figure 8:
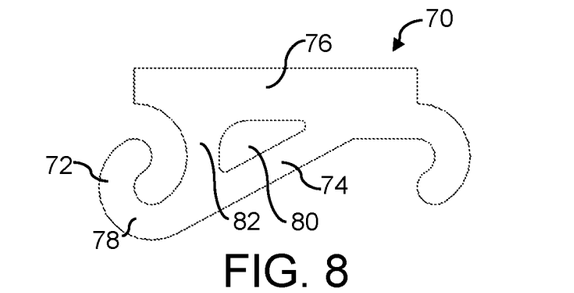
FIG. 8 is a side elevation view of another version of a belt module usable in a conveyor belt as in FIG. 4.

Another version of an extrudable conveyor belt module is shown in FIG. 8. The module 70 differs from the module 20 of FIG. 1 in that the first hook 72 has a buttress 74 that extends from the bottom of the module body 76 to a lower portion 78 of the first hook. The buttress 74 forms a lateral void 80 with the bottom of the module body 76 and a curved shank portion 82 of the first hook 72.

Figure 9:
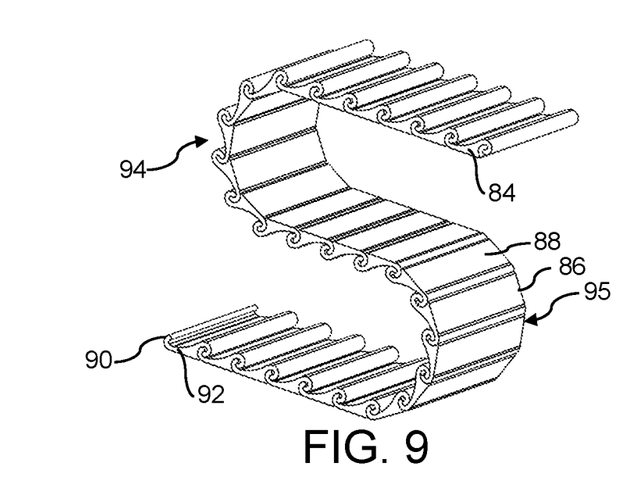
FIG. 9 is an isometric view of a portion of a conveyor belt made of modules capable of backbending.

Yet another version of an extruded conveyor belt module is shown in a section of belt in FIG. 9. The module 84 has a module body 86 with a flat top surface 88. A second hook 90 has a shank 92 that forms a continuation of the flat top surface 88. And, unlike the previously described modules, the module 84 of FIG. 9 is able to bend backward (as indicated by the arrow 94), as well as to bend forward (as indicated by the arrow 95).

Figure 10:
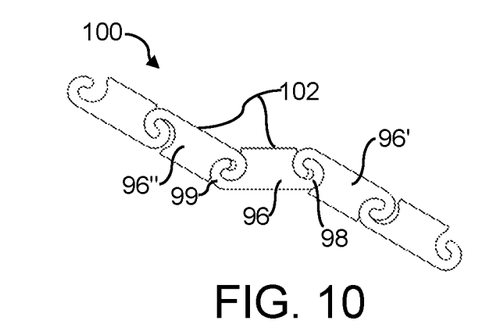
FIG. 10 is a side elevation view of a portion of a conveyor belt made of identical modules in which every other module is reversed top to bottom.
Figure 11:
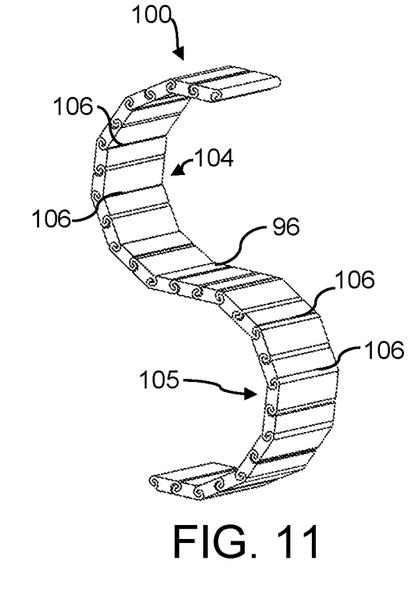
FIG. 11 is an isometric view of a portion of a conveyor belt as in FIG. 10 showing forward- and back-bending.

Still another version of a conveyor belt module that can be made by extrusion is shown in a portion of a modular conveyor belt in FIG. 10. All the modules 96, 96' are identical. They differ from the previously described modules in that the hooks 98, 99 are identical with the same thickness and arc length, and they bend in the same direction. When connected together in a belt 100, adjacent modules are oriented in opposite directions so that their hooks 98, 99 engage. As shown in FIG. 10, the module 96 is oriented with its hooks 98, 99 bending upward toward a conveying side 102 of the belt 100. The adjacent module 96' is oriented with its hooks 98, 99 bending downward away from the belt's conveying side 102. In this belt construction, any module, such as the module 96, can have one adjacent module 96' bend forward while the other adjacent module 96" bends backward. But no module can have both adjacent modules bend in the same direction. This is shown in FIG. 11 in which the modules 96 in the backbending portion 104 of the belt 100 can bend only at every other hinge joint 106. And the same is true in the forward-bending portion 105 of the belt 100.

Figure 12:
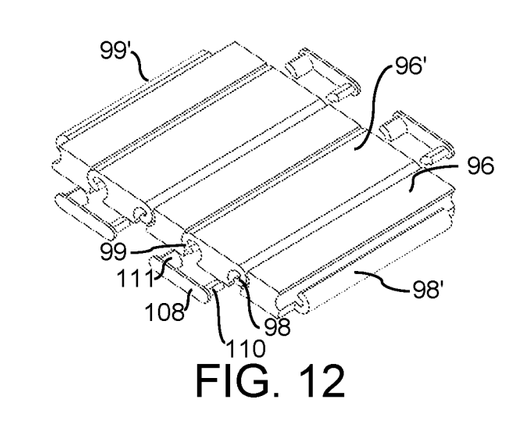
FIG. 12 is an isometric view of a conveyor belt made of modules as in FIG. 10 with stop plates to keep the modules aligned laterally.

The belt 100 of FIGS. 10 and 11 is shown in FIG. 12 made with modules 96 whose hooks 98', 99' are indented inward at both sides of the belt. The indentation allows a stop plate 108 with hook-shaped pins 110, 111 to be inserted into the hooks 98, 99 of every other module 96' to restrain adjacent modules from relative lateral translation. The pins 110, 111 can be slightly oversized to fit in the hooks 98, 99 in an interference fit.

Figure 13:
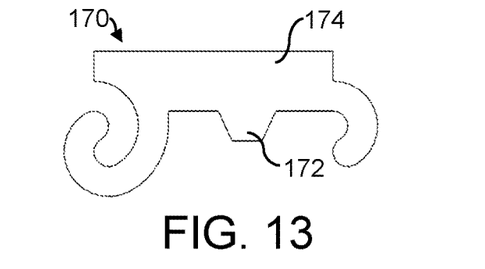
FIG. 13 is a side elevation view of another version of a belt module as in FIG. 2 with a drive tooth.

Other versions of extrudable modules are shown in FIGS. 13-18. The conveyor belt module 170 in FIG. 13 is similar to the module of FIG. 2 with the addition of a drive tooth 172 on the underside of the module body 174. The drive tooth 172 is available to receive a drive force from a drive sprocket or to impart a drive force to an idle sprocket.

Figure 14:
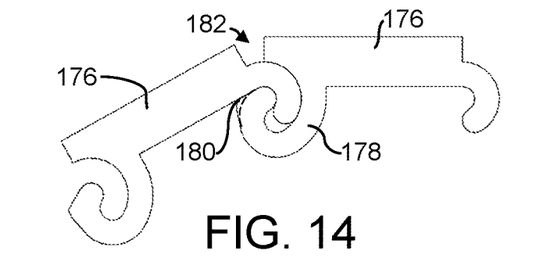
FIG. 14 is a side elevation view of two belt modules as in FIG. 2 with back stops.

The conveyor belt modules 176 in FIG. 14 are like those in FIG. 4 with the addition of protruding structures 180 at the tip end of the longer hook 178 forming a stop that limits forward articulation at the hinge joint 182 between adjacent connected modules 176.

Figure 15:
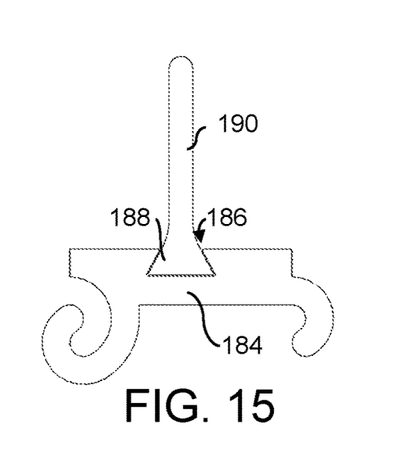
FIG. 15 is a side elevation view of another version of belt module as in FIG. 2 with an attachment joined to the module at a dovetail joint.
Figure 16:
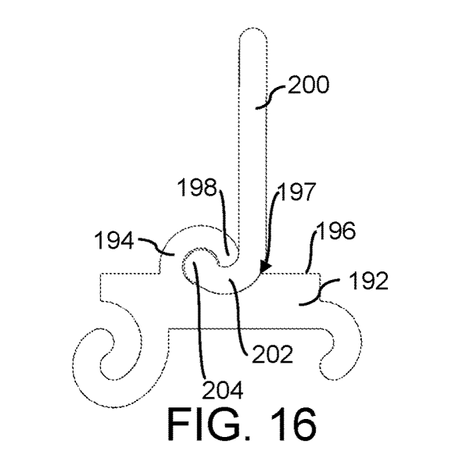
FIG. 16 is a side elevation view of another version of a belt module as in FIG. 2 with an attachment joined by an interference fit.

FIGS. 15 and 16 show conveyor belt modules and attachments. The top surface of the module 184 of FIG. 15 has a recess 186 such as a dovetail recess, that receives the dovetail base 188 of an attachment 190, such as a flight. The base 188 slides into the recess 186 from a side of the module 184. The module 192 in FIG. 16 has a hook 194 extending upward from the module's top surface 196, which has a recess 197 below the tip end 198 of the hook 194. An attachment 200, such as a flight, has a hook 202 with an enlarged tip end 204 that is retained by the module hook 194 in an interference fit. The attachment's hook base 202 sits in the recess 197. The attachment 200 can be inserted by sliding like the attachment of FIG. 15 or can be snapped into place by flexing the module hook 194.

Figures 17A, 17B, 18:
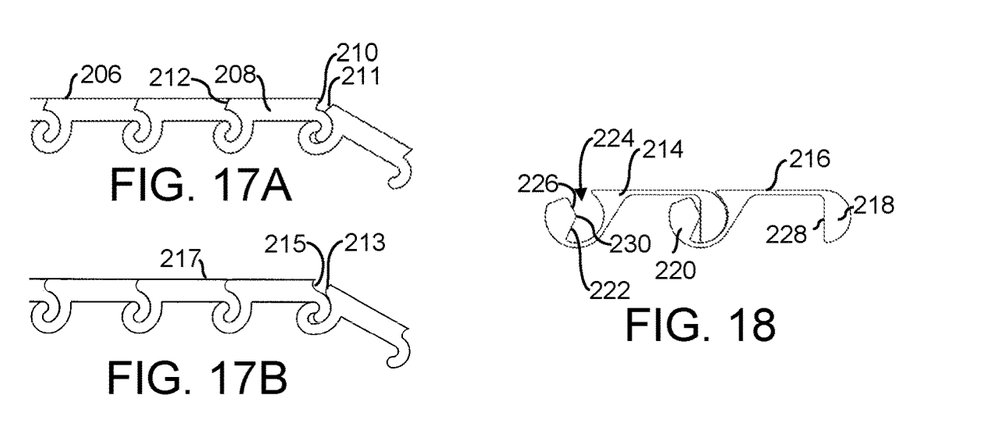
FIG. 17A is a side elevation view of a few links of another version of a belt module as in FIG. 2 with leading and trailing edges of the module body formed on an angle.
FIG. 17B is a side elevation view of a slightly different version of a belt module in which the angle is formed with curved leading and trailing edges.
FIG. 18 is a side elevation view of another version of a belt module embodying features of the invention including a D-shaped hook at one end.

FIG. 17A shows modules 206 as in FIG. 2 having a module body 208 with leading and trailing ends 210, 211 angled at the same angle to create seams 212 angled off vertical so that adjacent modules overlap at the hinge joints. The angled seams 212 are less likely to cause trip points along the carryway for lightweight, top-heavy conveyed articles than are vertical seams such as those in FIG. 4. In a slightly different version shown in FIG. 17B, the trailing and leading ends 213, 215 are complementary convex and concave curves that form seams that are angled off vertical at the top surface 217 and less likely to cause trip points than a vertical seam.

The conveyor belt modules 214 in FIG. 18 are shown with a module body 216 having a D-shaped hook 218 at one end and a longer hook 220 at the other end. The longer hook 220 has a first inner face 222 that forms a closed end of a curved channel 224 in which the D-shaped hook 218 of an interconnected module pivots. The closed end forms a stop that limits backward articulation of the modules 214 at the hinge joints. A second inner face 226 of the larger hook 220 forms a stop that limits the forward articulation at the hinge joint by contact with the flat face 228 of the D-shaped hook 218. The two inner faces 222, 226 meet at a vertex point 230 and form an obtuse angle. The vertex point 230, which forms a pivot point along a line of contact with the face 228 of the D-shaped hook 218, causes the two hooks to interact with rolling friction, rather than only sliding friction, and, thus, to reduce abrasion.

Figure 19:
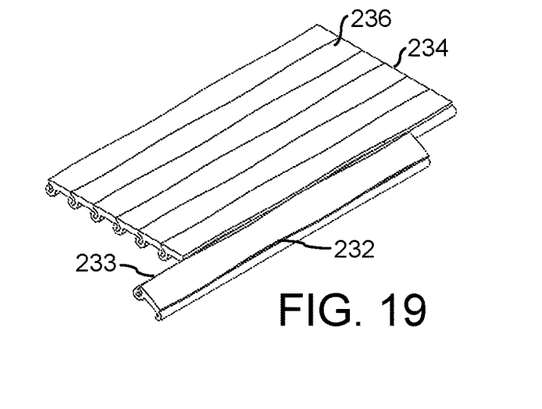
FIG. 19 is an isometric view of a few belt modules embodying features of the invention including nonlinear leading and trailing ends.
Figure 20:
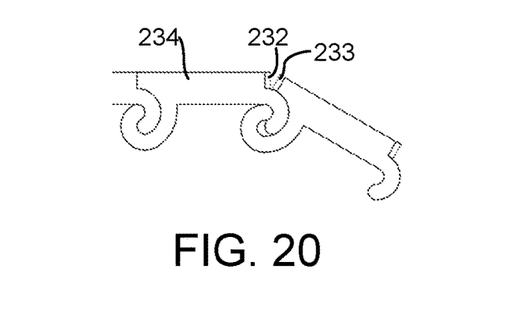
FIG. 20 is a side elevation view of a portion of the modules of FIG. 19.

Another way to prevent interconnected conveyor belt modules in a belt from shifting laterally without using a plug as in FIG. 7 is shown in FIGS. 19 and 20. Leading and trailing ends 232, 233 of each module 234 are nonlinear. In this example, the two ends 232, 233 are curved in complementary undulating patterns with the leading and trailing ends 232, 233 180° out of phase as shown, or in phase so that when the modules 234 are laterally aligned, their top surfaces 236 are generally continuous along the carryway. Modules 234 are connected or disconnected by tilting one out of plane with the other and sliding them laterally together or apart. Other nonlinear patterns, such as sawtooth, triangular, or other curved shapes, could be used.

Figure 21:
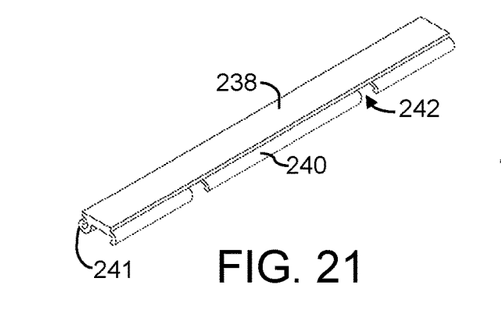
FIG. 21 is an isometric view of another version of a belt module as in FIG. 19 with hook segments separated by gaps.
Figure 22:
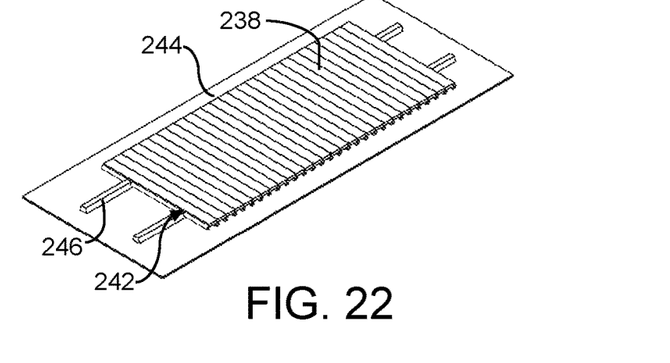
FIG. 22 is an isometric view of a portion of a conveyor belt constructed of modules as in FIG. 21 and tracked by guides received in the gaps between the hook segments.

FIGS. 21 and 22 show yet another way to maintain conveyor belt modules in line.

The conveyor belt modules 238 have first and second hooks 240, 241 along each end that are divided into segments by gaps 242. The gaps between the segments in the first segmented hook 240 are aligned with the gaps between the segments in the second segmented hook 241. When the modules 238 are connected to form a conveyor belt 244 as in FIG. 22, the aligned gaps 242 receive wearstrip guides 246 that restrain the modules from lateral offset.

Figure 23:
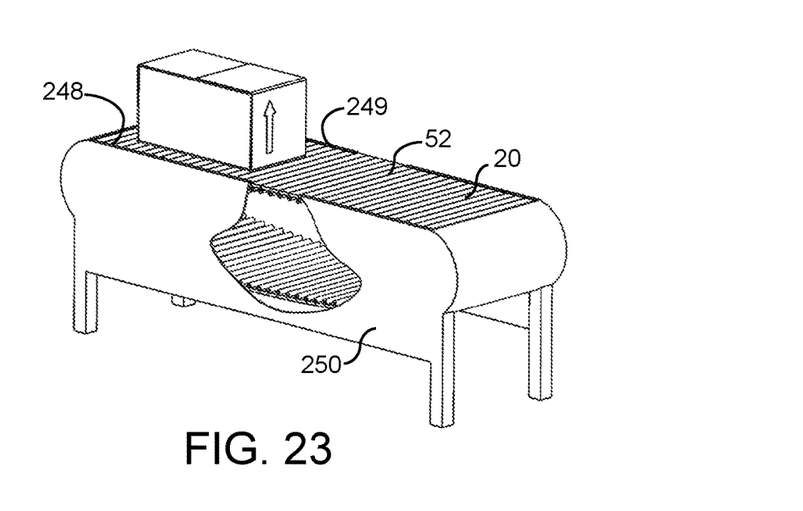
FIG. 23 is an isometric view of a conveyor frame with sideguards for restraining a conveyor belt as in FIG. 4 against lateral misalignment.

Another way to restrain the modules of a belt from lateral offset is shown in FIG. 23, in which the modules of a belt 52 as in FIG. 4 are restrained against lateral movement by the sides 248, 249 of a conveyor frame 250. The sides 248, 249 of the frame 250 are high enough to confine the belt 52 to a width only slightly greater than the width of each belt module 20.

Figure 24:
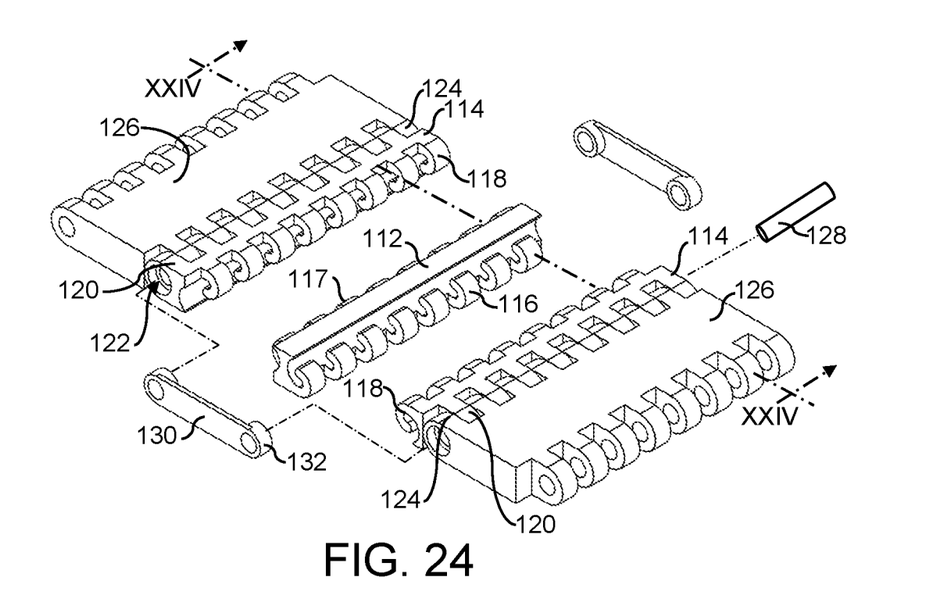
FIG. 24 is an exploded isometric view of a master link module used with connection modules embodying features of the invention to join the ends of a conventional modular conveyor belt to form an endless belt.
Figure 25:
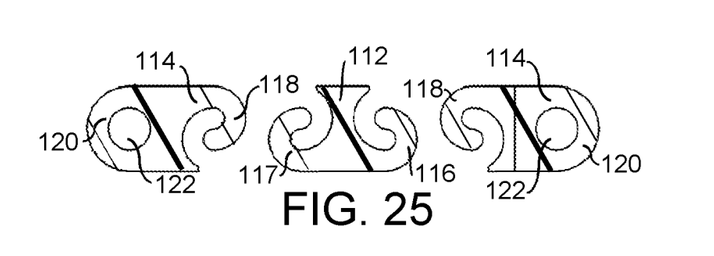
FIG. 25 is a cross sectional view of the master link and connection modules of FIG. 24 taken along lines XXIV-XXIV.

FIGS. 24 and 25 show a master link module 112 and connection modules 114 used to connect the ends of a modular plastic conveyor belt together to form an endless belt. The master link module 112 is similar in construction to the modules 96 of FIG. 10, except that the hooks are segmented into individual hook knuckles 116, 117. But a module 96 as in FIG. 10 having a single hook that is continuous across the width of the module at each end could be used instead. The hook knuckles 116, 117 at each end of the master link module 112 hook into mating hook knuckles 118 on facing ends of the connection modules 114. The hooks on the connection modules could be continuous like the hooks 98, 99 in FIG. 10. The distal ends of the connection modules have hinge elements 120 with aligned holes 122. The hinge elements 120 of the connection elements interleave with similar hinge elements 124 on standard modular conveyor belt modules 126. Hinge rods 128 inserted through the passageways formed by the aligned holes of the connection modules 114 and the standard conveyor belt modules 126 connect the connection modules to the standard conveyor belt modules 126, which are at ends of a standard modular conveyor belt constructed of standard belt modules interconnected at hinge joints by hinge rods. The distance between consecutive hinge joints of a standard modular conveyor belt defines the belt pitch.

When the ends of the standard belt are connected by hinge rods 128 to the connection modules 114, the belt can be closed into an endless belt by sliding the master link module 112 into aligned engagement with the two flanking connection modules 114. Stop plates 130 having bosses 132 are inserted into the outer rod holes 122 at both sides of the belt to retain the master link module 112 in place. The bosses 132 are retained in the rod holes 122 by an interference fit. The two connection modules 114 and the master link module 112 when connected have the same pitch measured from the centers of the rod holes 122 of one of the connection modules 114 to the centers of the rod holes of the other connection module as the belt pitch of the standard conveyor belt. When the belt is to be removed from a conveyor, one of the stop plates 130 is removed, and the master link module 112 is slid out of engagement with the two connection modules 114.

Figure 26:
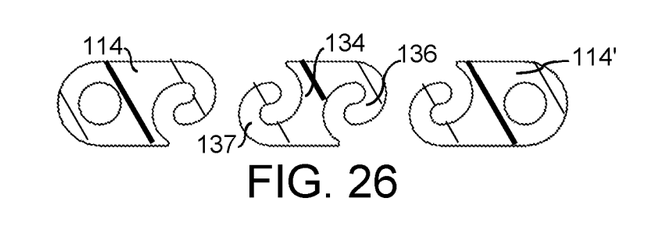
FIG. 26 is a cross section of another version of a master link and two connection modules for use in joining the ends of a modular belt.

An alternative master link module 134 is shown in FIG. 26. Hooks 136, at one end of the module 134 bend downward, and hooks 137 at the other end bend upward. And, although the connection modules 114, 114' may be the same as those in FIG. 25, one of the connection modules 114' is installed reversed top to bottom (compared to the connection modules in FIG. 25) with its hook bending upward to properly engage the downward-bending hook 136 of the master link module 134.

Figure 27:
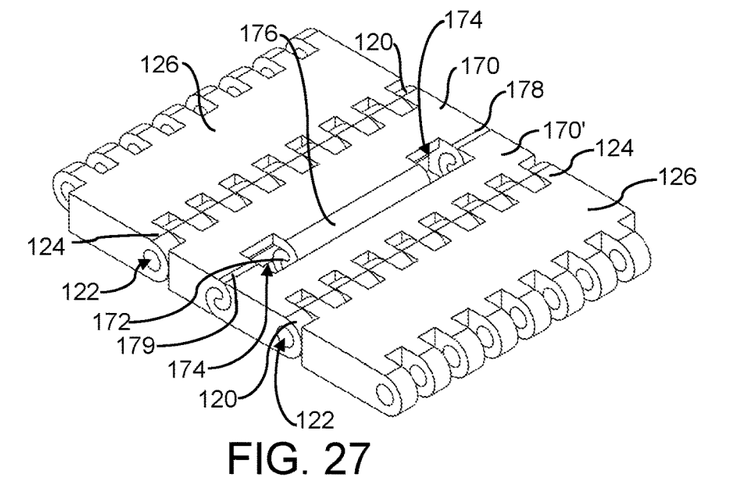
FIG. 27 is an isometric view of a pair of connection modules embodying features of the invention for joining the ends of conventional modular belts.
Figure 28:
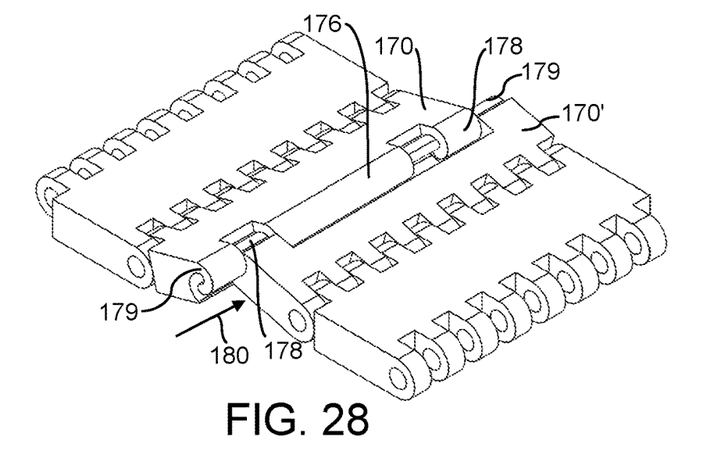
FIG. 28 is an isometric view of the connection modules of FIG. 27 in position for disconnection or reconnection of a modular belt.

FIGS. 27 and 28 show an alternative way of connecting the ends of a standard modular conveyor belt together without a master link module as in FIG. 24. Instead, a pair of connection modules 170, 170' have complementary segmented hooks 172 along the ends that hook together to join the connection modules. Hinge elements 120 along the opposite ends interleave with hinge elements 124 at the ends of the standard conveyor belt. Hinge rods through the passageways formed by the aligned holes 122 in the interleaved hinge elements 120, 124 connect the connection modules 170, 170' to the standard belt modules 126. The pitch of the hooked connection modules 170, 170', i.e., the spacing of the two passageways, is the same as the belt pitch of the standard belt modules 126. The two connection modules 170, 170' shown are identical, but one is reversed top to bottom so that the hooks 172 mate. The hooks 172 are segmented into three segments separated by gaps 174. A central hook segment 176 is longer than two outer hook segments 178, 179.

FIG. 28 illustrates how the connecting modules 170, 170' are disconnected. The modules 170, 170' are laterally offset as indicated by the arrow 180 so that the outer hook segments 178, 179 align with the gaps 174 of the other connection module or lie outside the other module's outer side. In that position the connection modules 170, 170' can be pivoted into disengagement and separated. Reconnection is just a reversal of those actions.

Figure 29:
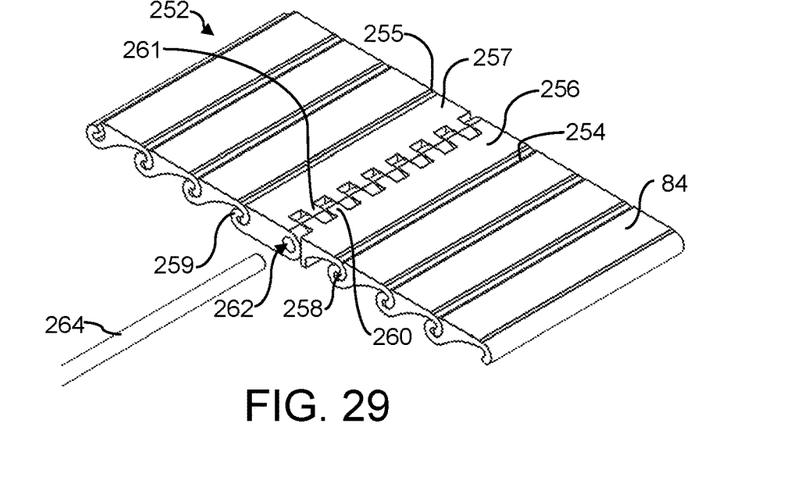
FIG. 29 is an isometric view of a portion of a modular hook-hinge belt as in FIG. 9 held together at a joint formed by two connecting modules as in FIG. 25.

FIG. 29 shows a portion of a conveyor belt 252 made up of modules 84 as in FIG. 9. The modules at the ends 254, 255 of the belt 252 are joined by two connection modules 256, 257. The connection modules 256, 257 have hooks 258, 259 at one end that connect with the hooks at the two belt ends 254, 255. Hinge elements 260, 261 with laterally aligned holes 262 are spaced apart along confronting ends of the connection modules 256, 257. The hinge elements 260, 261 are interleaved so that their holes 260 align and form a lateral passageway into which a hinge rod 264 can be inserted to connect the ends 254, 255 of the belt 252 together into an endless loop. The pitch of each connection module 256, 257 is the same as the pitch of the dual-hook belt modules 84.

Figure 30:
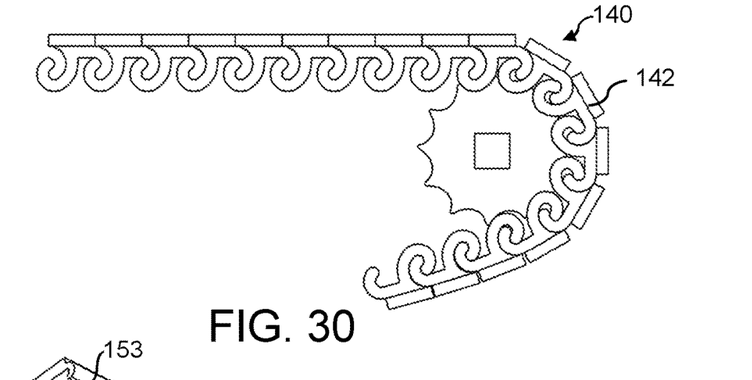
FIG. 30 is a side elevation view of a portion of a conveyor including a belt made of short-pitch modules embodying features of the invention.

FIG. 30 shows a portion of a modular conveyor belt 140 constructed of modules 142 like the modules 20 of FIG. 1, except shorter in length to be able to articulate around small-diameter sprockets and nose bars for tight product transfers. Because of the high back tension in tight-transfer belts, the modules 142 can be extruded or molded of a high-strength, low-stretch belt material, such as a carbon-fiber-filled polymer.

Figure 31:
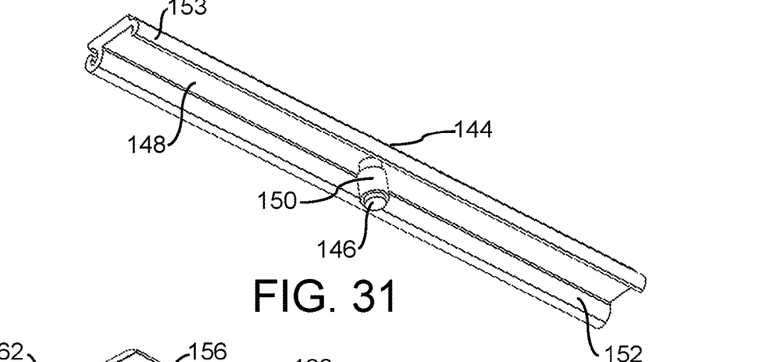
FIG. 31 is an isometric view of a belt module as in FIG. 3 with a depending peg.
Figure 32:
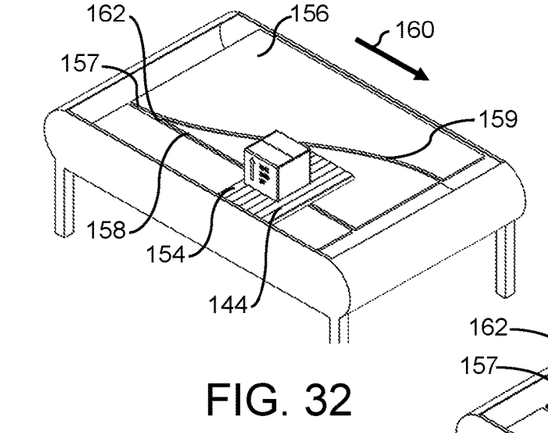
FIG. 32 is an isometric view of a diverting conveyor using belt modules as in FIG. 31 sharing the modules guided along a first path.
Figure 33:
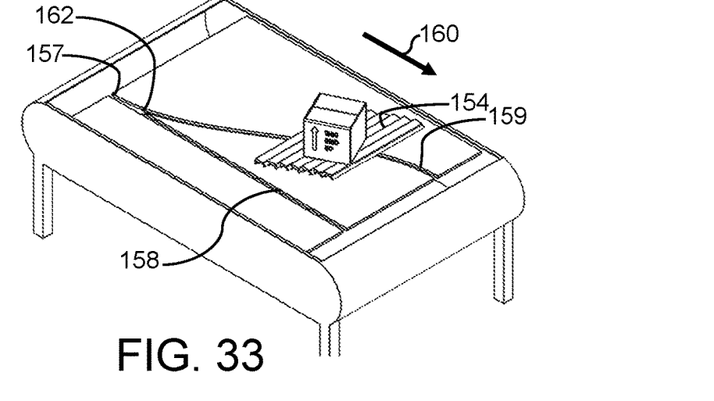
FIG. 33 is an isometric view as in FIG. 32 showing the modules guided along an alternate path.

FIG. 31 shows a belt module as in FIG. 1, except with a protrusion such as a peg 146 depending from the bottom of the platform 148, that operates as a slat module 144. The peg 146, which may include a roller 150 that is free to rotate about the axis of the peg, extends below the bottommost portions of the hooks 152, 153. Like the modules in the belt of FIG. 4, the slat modules 144 can be hooked together to form an endless belt 154—a portion of which is shown in the conveyor of FIGS. 32 and 33. The belt 154 rides on a carryway pan 156. The pan has a guide in the form of guide slots 157, 158, 159 defining entry, in-line, and divert paths for the belt modules 144. The pegs 146 ride in the slots 157, 158, 159 as the belt 154 advances in the conveyor direction 160. A suitable gate (not shown) at the fork 162 from the entry slot 157 to the in-line and divert guide slots 158, 159 selectively blocks one or the other of the slots 158, 159 to force the pegs 146 into the unblocked slot. If the belt 154 takes the divert path 159 as in FIG. 33, a justification guide path (not shown) in the return guides the modules 144 laterally back in line with the carryway's entry slot 157.

Figure 34:
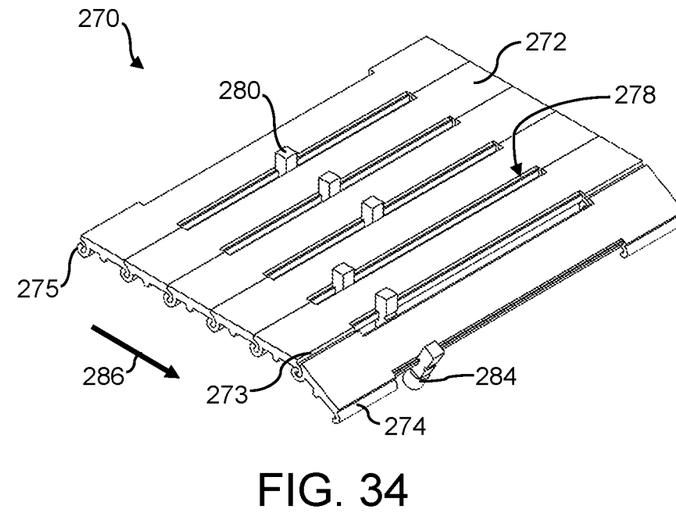
FIG. 34 is an isometric view of a portion of a sorting conveyor belt constructed of conveyor belt modules having some of the features of the module of FIG. 1 and embodying other features.
Figure 35:
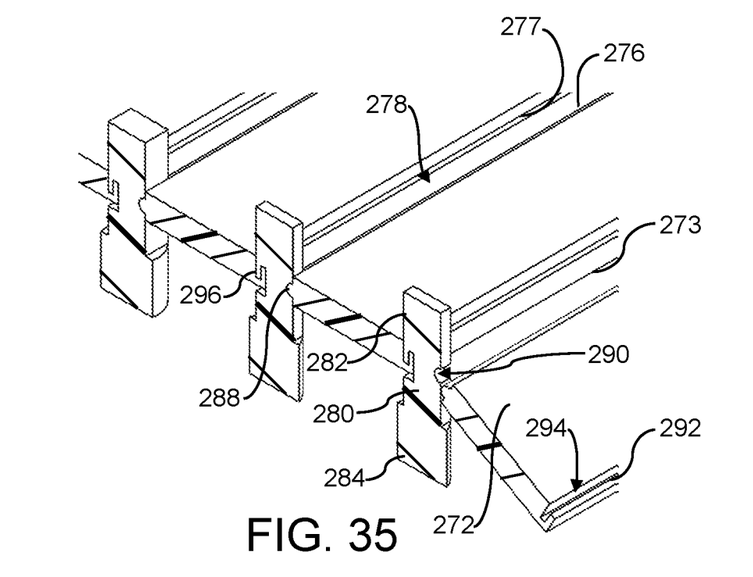
FIG. 35 is an enlarged cross section of a portion of the sorting conveyor belt of FIG. 34.

A portion of a sorting conveyor belt constructed of conveyor belt modules having some of the features of the module in FIG. 1 and other features is shown in FIGS. 34 and 35. The belt 270 is constructed of a series of conveyor belt modules 272 hooked together at hinge joints 273 end to end with hooks 274, 275 on opposite ends of each module at both sides. Each module 272 has a first recessed track 276 along one end and a second recessed track 277 along an opposite end. The tracks 276, 277 extend across the width of the belt 270 between the hooks 274, 275 at the sides of the modules 272. The confronting recessed tracks 276, 277 of adjacent belt modules 272 form an elongated slot 278 that extends across the width of the belt 270 and through the belt's thickness. A mover 280 is received in each slot 278. The mover 280 has an upper portion 282 that protrudes above the slot 278 and a lower portion 284 that protrudes below the slot and the underside of the belt 270. The lower portion 284 serves as a cam follower that engages with guides extending across the belt carryway to push the movers 280 along the slot 278 as the belt advances in a direction of belt travel 286. The upper portion 282, shown in FIGS. 34 and 35 as a post, pushes conveyed articles across the width of the belt 270. Instead of a post, the upper portion could be a lower-profile platform for carrying conveyed articles across the belt 270. Each mover 280 has structure that engages the structure of the recessed tracks 276, 277. The first track 276 has a rounded half-pipe 288 that extends along the track. The rounded half-pipe protrusion 288 is received in a complementary rounded recess 290 in the mover 280. The rounded protrusion 288 can pivot in the rounded recess 290 to allow the belt 270 to articulate at the hinge joint 273. The second track 277 has an L bracket 292 that forms an upwardly open channel 294. Complementary structure 296 on the mover 280 engages the L bracket 292 to confine the slidable mover 280 to the slot 278.

What is claimed is:

1. A conveyor belt module comprising:
   a module body extending in a width direction from a first side to a second side and in a length direction from a first end to a second end;
   a first hook disposed at the first end of the module body and having a tip end;
   a second hook disposed at the second end of the module body and having a tip end;
   wherein the first hook forms a first curved channel having an open end and a closed end and defining a first path perpendicular to the width direction;
   wherein the first curved channel is configured to receive the second hook at the second end of an adjacent conveyor belt module to connect the conveyor belt module to the adjacent conveyor belt module at a hinge joint at which the connected conveyor belt modules can articulate as the second hook advances and retreats along the first path;
   wherein the second hook and the first curved channel are complementary in shape so that a portion of the second hook of the adjacent conveyor belt module when received in the first curved channel fills the width of a portion of the first curved channel in which the second hook is received; and
   wherein the first hook bends upward to the tip end and the second hook bends upward to a tip end or both the first hook and the second hook bend downward to their tip ends.

2. A conveyor belt module as claimed in claim 1 wherein the arc length of the first hook is greater than the arc length of the second hook.

3. A conveyor belt module as claimed in claim 1 wherein the first hook and the second hook extend along the width of the module body from the first side to the second side.

4. A conveyor belt module as claimed in claim 1 wherein the first hook and the second hook extend along the width of the module body between the first side and the second side and wherein opposite ends of the second hook are indented inward from the first and second sides.

5. A conveyor belt module as claimed in claim 4 comprising stop plugs inserted into the first curved channel at the first and second sides to prevent relative lateral movement of an adjacent conveyor belt module whose indented second hooks are received in the first curved channel.

6. A conveyor belt module as claimed in claim 1 wherein the first and second hooks comprise hook segments separated by one or more gaps.

7. A conveyor belt module as claimed in claim 1 wherein the module body has a flat top surface and wherein the second hook has a shank that forms a continuation of the flat top surface.

8. A conveyor belt module as claimed in claim 1 comprising a peg extending downward from the module body to a level below the levels of the first and second hooks.

9. A conveyor belt module as claimed in claim 1 wherein a portion of the first hook lies below the level of the bottom of the second hook.

10. A conveyor belt module as claimed in claim 1 wherein the first hook has a curved shank.

11. A conveyor belt module as claimed in claim 1 made of extruded aluminum and wherein one of the hooks is bronze-coated.

12. A conveyor belt module as claimed in claim 1 wherein the first and second ends of the module body have complementary undulating patterns.

13. A conveyor belt module as claimed in claim 1 comprising an attachment having a base and wherein the module body has a top surface with a recess for receiving the base of the attachment.

14. A conveyor belt module as claimed in claim 1 wherein one side of the first curved channel is formed by two flat surfaces that meet and form an obtuse angle at a vertex.

15. A conveyor belt module as claimed in in claim 1 wherein the first and second ends of the module body are angled at the same angle off vertical.

16. A conveyor belt module as claimed in claim 15 wherein the first end of the module body is convex and the second end is concave and complementary in shape to the first end and both ends form the same angle with a top surface of the module body.

17. A conveyor belt module as claimed in claim 1 wherein the first end of the module body has a first undulating pattern and the second end of the module body has a second undulating pattern.

18. A conveyor belt comprising:
a length of a modular conveyor belt having a first end and a second end and hinge elements spaced apart along the first and second ends with aligned holes through the hinge elements, wherein the modular conveyor belt articulates at hinge joints whose regular spacing defines a belt pitch;
a first connection module having a first end and a second end and a hook at the first end and spaced apart hinge elements with aligned holes along the second end that interleave with the hinge elements along the first end of the length of modular conveyor belt, wherein the aligned holes of the interleaved hinge elements form a first passageway across the width of the modular conveyor belt;
a second connection module having a first end and a second end and a hook at the second end and spaced apart hinge elements with aligned holes along the first end that interleave with the hinge elements along the second end of the length of modular conveyor belt, wherein the aligned holes of the interleaved hinge elements form a second passageway across the width of the modular conveyor belt;
a first hinge rod received in the first passageway to connect the first connection module to the second end of the length of the modular conveyor belt to form a first hinge joint;
a second hinge rod received in the second passageway to connect the first connection module to the first end of the length of the modular conveyor belt to form a second hinge joint.

19. A conveyor belt as claimed in claim 18 wherein the hook at the first end of the first connection module is hooked to the hook at the second end of the second connection module at a hinge joint forming an endless conveyor belt loop of the first and second connection modules and the length of the modular conveyor belt.

20. A conveyor belt as claimed in claim 18 comprising a master link module having a first end and a second end and a first hook at the first end and a second hook at the second end, wherein the first hook of the master link module hooks to the hook at the second end of the second connection module and the second hook of the master link module hooks to the hook at the first end of the first connection module to form an endless conveyor belt loop with the first and second connection modules and the length of the modular conveyor belt.

21. A conveyor belt as claimed in claim 18 wherein spacing of the first and second passageways equals the belt pitch.

22. A conveyor belt as claimed in claim 18 wherein the hook at the first end of the first connection module and the hook at the second end of the second connection module each include hook segments separated by one or more gaps.

23. A conveyor belt comprising:
a plurality of conveyor belt modules, each extending in width from a first side to a second side and in length in a direction of belt travel from a first end to a second end and in thickness from a top surface to an underside and including:
first hooks along the first end and second hooks along the second end, wherein the first hooks of each conveyor belt module hook with the second hooks of an adjacent one of the modules at hinge joints to form an endless belt loop;
a first recessed track extending along the first end between the first hooks and a second recessed track extending along the second end between the second hooks, wherein the first recessed track of each conveyor belt module forms with the second recessed track of an adjacent conveyor belt module an elongated slot extending across a portion of the width of the conveyor belt modules and through the thickness of the conveyor belt modules from the top surface to the underside;
a mover received in each elongated slot and engaging the first and second recessed tracks for movement along the elongated slot and including an upper portion protruding above the slot and the top surface and a lower portion protruding below the slot and the underside.

24. A conveyor belt as claimed in claim 23 wherein the second recessed track includes a rounded protrusion extending along the elongated slot and wherein the mover includes a rounded recess receiving the rounded protrusion to allow the conveyor belt to articulate at the hinge joint.

* * * * *